June 19, 1956  J. W. LOWER  2,751,540
AUTOMATIC STEERING APPARATUS
Filed April 10, 1952

INVENTOR.
JACK W. LOWER
BY George H. Fisher
ATTORNEY

United States Patent Office 2,751,540
Patented June 19, 1956

2,751,540

AUTOMATIC STEERING APPARATUS

Jack W. Lower, Minneapolis, Minn., assignor to Minneapolis-Honeywell Regulator Company, Minneapolis, Minn., a corporation of Delaware Application April 10, 1952, Serial No. 281,525

8 Claims. (Cl. 318—489)

The present invention pertains to apparatus for the automatic control of a dirigible craft and more particularly to automatic pilots for aircraft. An object of the present invention is to provide a novel automatic control apparatus for an aircraft wherein the operation of a control surface of the craft is shifted from reliance upon automatic control to manual operation of the control surface and wherein said surface control may be returned to said automatic apparatus without the introduction of abrupt deflections of the control surface following such reapplication.

Another object of this invention is to provide a synchronizing arrangement for the automatic pilot disclosed in an application of Benjamin H. Ciscel, Serial No. 263,882, filed December 28, 1951, inwardly herewith. In that application, control surface displacement signals were applied to the amplifier which control the elevator servomotor and also to the torque motor for the gyroscope. When the elevator surface was manually operated, surface displacement signals during such manual control were applied to the servomotor amplifier. The amplifier in turn would control the gyroscope torque motor until the gyroscope signal generator balanced the network of the amplifier. While it was assumed that synchronization had been obtained with the above arrangement, if the elevator surface were displaced to hold a new altitude and were automatic control then applied this displaced elevator would provide a signal which would be applied to the gyro torque resulting in gyro precession. Therefore "bumps" in the flight of the airplane were encountered when the autopilot was engaged and using such synchronizing arrangement.

A further object of this invention is to provide a synchronizing arrangement for an automatic pilot which includes a gyroscope providing rate functions and displacement functions and which synchronizing arrangement functions during manual control of the surface of the aircraft to prevent deflections of the control surface following the application of automatic control to said surface.

A further object of this invention is to provide novel control apparatus wherein smooth transition from manual operation of a control surface to automatic operation of said control surface is effected without lurch to the aircraft.

Figure 1:
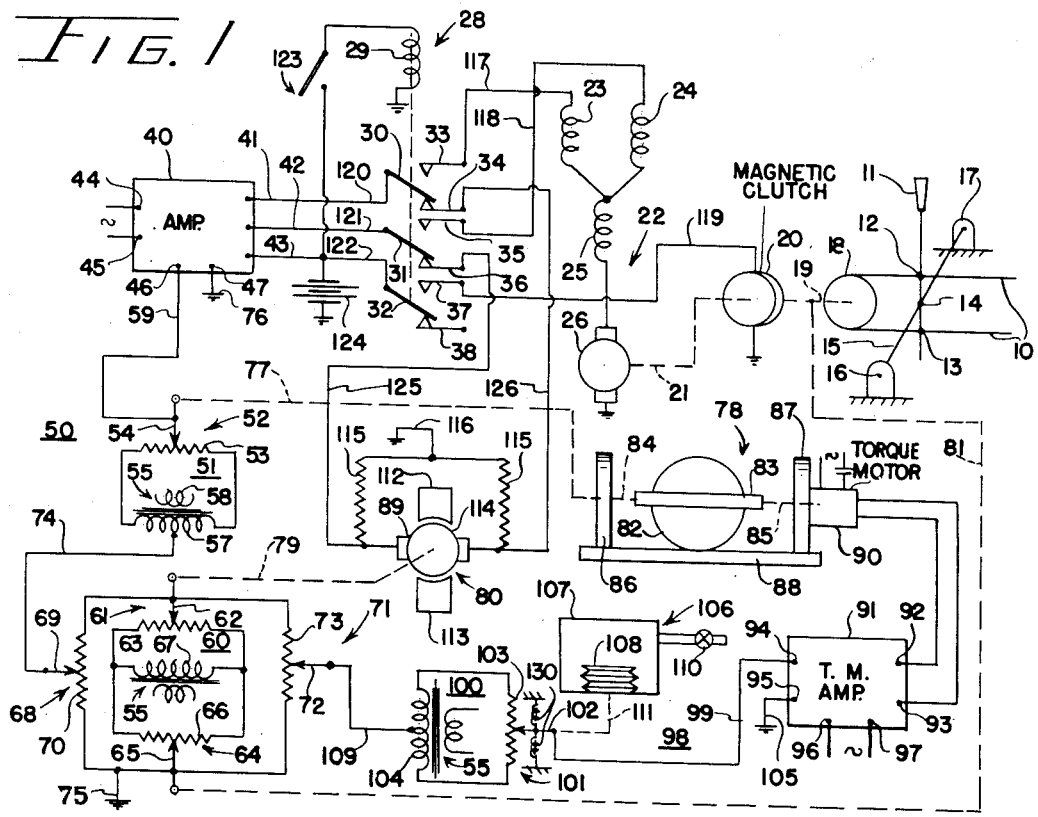
Figure 2:
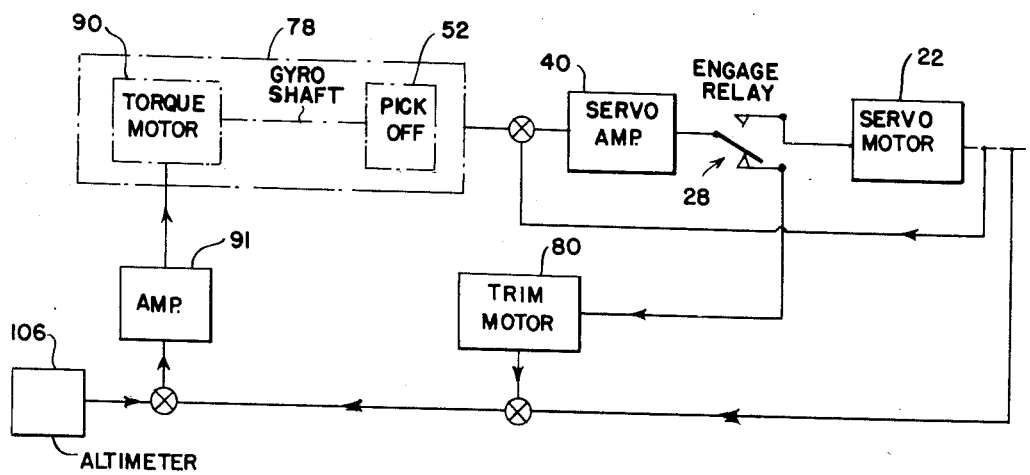

Other objects and advantages of the invention will become apparent from a consideration of the accompanying specification taken in connection with the accompanying drawings, wherein:

Figure 1 illustrates an embodiment of the present invention utilized for control of the elevator of an aircraft; and Figure 2 is a modification of the arrangement in Figure 1.

Referring to Figure 1, the control surface for changing the attitude of the craft about an axis is operated by cables 10 extending from a cable drum 18 carried by a servomotor output shaft 19. The output shaft 19 is operatively connected to shaft 21 of servomotor 22 through a magnetic clutch 20. An engage relay 28 when energized, operatively connects shafts 19 and 21 and also electrically connects servomotor 22 with an amplifier 40. Amplifier 40 reversibly operates motor 22, the direction of rotation being dependent upon the phase of an input signal applied to amplifier from a control circuit 50 relative to a reference voltage. The control circuit 50 includes an angular rate signal generator 52 positioned from a rate of change of attitude gyroscope 78, a synchronizing signal generator 61 driven from a centering or synchronizing motor 80, and a follow-up signal generator 64 positioned from the servomotor output shaft 19. The gyroscope 78 precesses in accordance with the rate of change of attitude of the craft and in order to limit the precession in accordance with the angular rate the gyroscope is provided with a torque motor 90 which is controlled from an amplifier 91. The amplifier is energized from a balanceable signal network 98 to limit the precession of gyroscope 78.

When the engage relay 28 is not energized, the control surface cable 10 may be manually operated from a control stick 11 to change the attitude of the aircraft. Operation of the control stick will result in adjustment of the signal generator 64. Additionally, in response to the manual operation of the control surface, the craft will change attitude which will cause the gyroscope 78 to precess and operate rate signal generator 52 so that both generators unbalance network 50. In order to maintain the control circuit 50 in a balanced condition so that the control system is synchronized with the craft during manual operation of the control surface, the amplifier 40 now controls the operation of the synchronizing or trim motor 80. The motor 80 in turn positions the synchronizing signal generator 61 which balances the control circuit 50. Network 60 is interconnected with network 100 and circuit 98 is thereby unbalanced and through amplifier 91 applies energization to torque motor 90 to limit the precession of gyroscope 78 in accordance with the rate of change of attitude of the aircraft.

During automatic control of the aircraft control surface, the gyroscope 78 opposes change in attitude of the aircraft about its axis. Since the gyroscope 78 is utilized as a rate of change of attitude device would not restore the craft to its original position, a slaving signal generator 101 is used to further operate amplifier 91 and thus torque motor 90 to return the craft to original conditions. In the particular instance the slaving signal generator 101 is operated from an altimeter 106 to maintain the craft at a condition of constant altitude.

For a clearer understanding of the relationships and the details of the elements constituting the apparatus reference is made to the following detailed description. The manual control stick 11 is secured at an intermediate point 14 to a lateral shaft 15. The shaft 15 in turn is supported in bearings 16, 17 on the craft. The control lever 11 is fastened to cables 10 by a suitable clamping means 12, 13. The clamping means are such as to permit rotation of control stick 11 during rectilineal movement of cables 10. The servomotor 22 is of the reversible D. C. type having a pair of field windings 23, 24, a pulsing clutch winding 25, and an armature 26 for driving shaft 21. One end of motor field winding 23 is connected to one end of motor field winding 24 and their junction is connected to one end of pulsing clutch winding 25. The opposite end of winding 25 is connected to one brush of armature 26 with the opposite brush being connected to ground. The pulsing clutch 25 is of the type which normally holds armature 26 in a braked position. When either motor field winding 23 or 24 is energized, clutch winding 25 is also energized which releases the armature 26 from its braked position and permits operation of the shaft 21. The motor-clutch brake combination is old in the art and the details thereof form no essential part of the present invention.

Engage relay 28 is of the three pole double throw type having an operating winding 29, arms 30, 31 and 32 which coact respectively with contacts 33, 34; 35, 36; and 37, 38. A conductor 117 extends from in contact 33 to the remaining end of motor winding 23; a conductor 118 extends between in contact 35 and the remaining end of motor winding 24; and a conductor 119 extends between in contact 37 and one side of magnetic clutch 20 whose opposite side is connected to ground. The operating winding 29 of relay 28 is energized from a battery 124 through a single pole single throw switch 123.

Amplifier 40 is of the A. C. discriminator type having power input terminals 44, 45; signal input terminals 46, 47; a D. C. input connection 43; and D. C. output connections 41, 42. The amplifier is of the discriminator type and operates a pair of relays alternatively depending upon the phase relationship of the signal voltage across terminals 46, 47 with respect to the phase of the alternating voltage across input terminals 44, 45. Upon operation of one or the other of the relays, the D. C. voltage is led from battery 124, to connection 43 and thence through the operated amplifier relay to one or the other of connections 41, 42. The amplifier may be of the type disclosed in the patent to Willis H. Gille et al., 2,425,734. Connection 41 extends to relay arm 30; connection 42 extends to relay arm 31, and a conductor 122 connects battery 124 with relay arm 32.

The signal voltage across amplifier terminals 46, 47 is derived from a balanceable control circuit 50 comprising networks 51 and 60. Network 51 comprises a rate of turn pickoff or signal generator consisting of a potentiometer 52 having a resistor 53 and slider 54 and a transformer 55 having a secondary winding 57 and a primary winding 58. Resistor 53 is connected across secondary winding 57. A conductor 59 connects terminal 46 with slider 54. Slider 54 is adjusted along resistor 53 by a suitable operating connection 77 from a rate of change of attitude gyroscope 78.

Network 60 comprises a synchronizing potentiometer 61, a rebalance potentiometer 64, a displacement ratio potentiometer 68, a rate ratio potentiometer 71, and a transformer 55. To accord with a common practice a single primary winding of a transformer is utilized to supply a plurality of secondaries so that the transformer 55 is common to the plurality of networks. Potentiometer 61 includes a slider 62 and a resistor 63 which is connected across a secondary winding 67 of transformer 55. Potentiometer 64 includes a slider 65 and a resistor 66 which is connected across the ends of secondary winding 67 in parallel with resistor 63. Potentiometer 68 includes a slider 69 and a resistor 70 which is connected across sliders 62 and 65. Potentiometer 71 includes a slider 72 and a resistor 73 which also is connected across sliders 62 and 65. Slider 65 is connected to ground by conductor 75. A conductor 74 extends from a center tap of secondary winding 57 of network 51 to slider 69. The control circuit is completed to amplifier terminal 47 through its ground conductor 76. Slider 62 is positioned along resistor 63 by a suitable operating connection 79 from synchronizing motor 80. Slider 65 is positioned along resistor 66 through a suitable operating connection 81 from the servomotor output shaft 19. Sliders 69 and 72 are manually adjusted. They are used to select any desired portion of the voltage between sliders 62 and 65 due to their relative displacements.

The gyroscope 78 is of the two degree of angular freedom type with its rotor having motion about a spin axis and a precession axis. It comprises a rotor 82 rotatably carried in a gimbal ring 83. Ring 83 in turn is carried by trunnions 84 and 85 which are journaled in pedestal bearings 86, 87. Trunnion 84 is connected through a suitable connecting means 77 to slider 54 to position the latter upon precession of the gyroscope. The axis of the trunnions is at right angles to the spin axis of rotor 82. The bearings 86 and 87 are supported on a base member 88. The base member is so mounted in the airplane that the axis of trunnions 84 and 85 is parallel to the longitudinal axis of the craft. Associated with trunnion 85 and bearing 87 is a torque motor 90. The motor 90 may be of the alternating current capacitor induction type with the field windings supported on bearing 87 and the rotor carried on trunnion 85. Motor 90 has one phase winding energized from a source of alternating voltage which also supplies the primary winding 58 of transformer 55. The remaining phase winding of motor 90 is energized from an amplifier 91. Amplifier 91 serves to energize the remaining motor winding in quadrature relationship to the energization of the motor line winding dependent upon the phase relationship of a control voltage to the source voltage. Amplifier 91 comprises output terminals 92, 93 connected to the remaining winding of a motor 90; signal input terminals 94, 95; and power input terminals 96, 97 connected to the source of alternating voltage.

Control voltage signals which are applied across terminals 94, 95 are derived from a control circuit 98. Circuit 98 includes a slaving network 100 and voltage dividing potentiometer 71. Network 100 comprises a potentiometer 101 having a slider 102 and a resistor 103 which is connected across a secondary winding 104 of transformer 55. A conductor 99 extends from slider 102 to amplifier terminal 94. A conductor 109 extends from a center tap of secondary winding 104 to slider 72 of voltage dividing potentiometer 71. The circuit is completed from network ground conductor 75 to ground conductor 105 extending from amplifier terminal 95.

Slider 102 is positioned along resistor 103 from an altimeter 106 by a suitable operating connection 111. The altimeter 106, for example, comprises an outer casing 107 within which is suitably supported a sealed bellows 108 connected to operating means 111. Communication to the interior of casing 107 and to the exterior of bellows 108 from the atmospheric pressure is effected by a suitable valve 110. A releasable clutch may be provided between operating means 111 and slider 102 to permit centering of slider 102 by spring means 130.

Synchronizing motor 80 is of the direct current type having permanent magnets 112, 113 for supplying a field within which rotates armature 89. Across the armature brushes is connected an elongated resistor 115 having a center tap which is connected to ground by conductor 116. One end of resistor 115 connected to one motor brush is connected further through conductor 125 to out contact 36 of relay 28. The opposite brush of armature 89 is connected by conductor 126 to out contact 34 of relay 28. Armature 89 is connected through operating means 79 to slider 62.

It is apparent that with the craft airborne and with the engage switch 123 closed the engage relay is operated. A circuit comprising battery 124, conductor 122, relay arm 32, contact 37, conductor 119 is completed through the magnetic clutch 20 which is energized to connect servomotor 22 with the control surface of the aircraft. With relay 28 energized, motor windings 23 and 24 are connected through arms 30, 31 and contacts 33, 35 to amplifier output connections 41, 42.

In the present arrangement, the gyroscope 78 is so mounted on the aircraft that it will precess about the axis of trunnions 84, 85 upon change in pitch attitude of the aircraft. Should a disturbance cause a change in pitch attitude of the aircraft the gyroscope 78 will precess about the axis of trunnions 84, 85 and displace slider 54 in network 51. The servo amplifier 40 has its input circuit 50 thereby unbalanced, and it effects rotation of servomotor 22 to apply corrective elevator. The operation of the servomotor is accompanied by movement of follow-up or rebalance slider 65 by operating means 81 to balance the input circuit 50. This balance is achieved by relatively positioning slider 65 with respect to slider 62 to derive a voltage equal and opposite to the voltage between slider 54 and the center tap of secondary winding 57 of network 51.

With slider 72 at the lower end and slider 69 at the upper end, the torque motor 90 is unenergized from the rebalance potentiometer 61 and the apparatus functions as a displacement autopilot. On the other hand if the positions of the sliders are reversed, the apparatus functions as a rate autopilot.

If the voltage between sliders 62 and 65 or a portion thereof is merely used to oppose the voltage from network 51 then it is evident that the gyroscope 78 will precess as long as the aircraft changes its attitude about the pitch axis so that the gyroscope may be considered a displacement gyroscope. However, if the full voltage between sliders 62 and 65 in addition to being used to oppose the voltage from network 51 is also utilized through amplifier 91 to energize torque motor 90 then the extent of precession of gyroscope 78 is limited to the rate of change of pitch attitude.

It is further evident that if only a portion of the voltage between sliders 62 and 65 is applied to amplifier 91 by adjusting slider 72 that the extent of precession of the rotor 82 of gyroscope 78 will be greater than that displacement which is proportional to the rate of change of pitch attitude, in other words the gyro has precessed an angular distance which is a function of the rate of change of pitch attitude and the extent of pitch attitude change. The relative adjustments of sliders 69 and 72 determine the proportion of the precession of gyroscope 78 which is due to the rate of change of pitch attitude.

Since the precession of gyroscope 78 is due to a change in pitch attitude of a displacement character and to rate of change of pitch attitude, then it is apparent that the gyroscope, when the maximum change of pitch attitude has been attained and the pitch rate is zero, will move slider 54 of potentiometer 52 toward its center position. The actual displacement of slider 54 from the center of resistor 53 is now less than the actual change in pitch attitude of the aircraft. It is thus evident that the signal from potentiometer 52 being less than pitch attitude change could not of itself serve to return the craft to its original pitch attitude. Consequently, it is necessary to provide a slaving arrangement such as the altimeter 106 to effect such return. If the craft does not return to level pitch attitude because of the insufficiency of the signal from potentiometer 52, it tends to change altitude and with the valve 110 open to atmospheric pressure, changes in altitude are reflected in movement of bellows 108. The bellows 108 operates slider 102 to apply a signal in network 98 which additionally precesses gyro 78. This precession of gyroscope 78 adjusts slider 54 so that a control signal is applied to network 50 tending to restore the craft to its original altitude.

When the control surface is to be manually operated from control stick 11, the engage switch 123 is moved to open position to deenergize operating winding 29 of relay 28. The magnetic clutch 20 is thereby deenergized and the windings 23 and 24 of servomotor 22 are no longer associated with amplifier output connections 41 and 42. Instead these connections 41 and 42 are now associated with the armature 89 of synchronizing motor 80. If the control stick 11 now be manually moved, the follow-up or rebalance slider 65 is adjusted concurrently with the movement of the control surface to displace slider 65 relative to slider 62 and to thus unbalance network 50. The amplifier 40 operates on this unbalance and through output connections 41 or 42 energizes synchronizing motor 80 to cause its rotation in one or another direction to adjust slider 62 of synchronizing potentiometer 61 whereby network 50 is again brought to balance condition. The positioning of the control surface manually also causes a change in angular position of the craft about its pitch axis. This change in angular position is sensed by the gyroscope 78. The gyroscope 78 precesses and adjusts slider 54 of potentiometer 52. The amplifier 40 causes rotation of synchronizing motor 80 to adjust slider 62 so that the voltage between sliders 62 and 65 is equal but opposite to that between slider 54 and the center tap of secondary winding 57 in network 51. Also the voltage selected by slider 72, due to the relative positioning of sliders 62 and 65, through amplifier 91 energizes motor 90 to modify the precession of gyroscope 78 in proportion to the rate of change of pitch attitude. Thus slider 62 will have been positioned relative to slider 65 so that a portion of this voltage selected by slider 69 balances network 50. It is assumed that during manual operation of the control surface that valve 110 is closed so that the pressure within casing 107 is equal to that of sealed bellows 108 so that slider 102 is centered on resistor 101 by spring means 130.

In Figure 2, there is shown a modification of the arrangement of the various potentiometers during the synchronizing arrangement. In Figure 2, the summing networks are conventionally shown as circled crosses resembling mechanical differentials. In this modification, the servo amplifier 40 is controlled by the gyro pickoff signal generator 52 and a servomotor positioned rebalance signal generator but the synchronizing or trim motor signal generator has been omitted from the servo amplifier input circuit. As in Figure 1, the torque motor amplifier 91 has an input circuit which includes the servomotor position signal generator, a trim motor position signal generator 52, and an altimeter signal generator from altimeter 106. In the arrangement as illustrated, the trim motor is driven by the servo amplifier and operates its signal generator to precess the gyro to wipe out the control surface or servomotor position signal into the servo amplifier. Balance is attained when the trim signal balances out the control surface position signal into the torque motor amplifier 91 and the pickoff signal generator gyroscope 78 balances out the control surface position signal into the servo amplifier. While the synchronizing arrangement of Figure 2 may in general be found satisfactory, the arrangement of Figure 1 is preferred since it avoids the oscillations of the trim motor during synchronizing which is present in arrangement 2 and thus a more rapid synchronized condition is obtained by the arrangement in Figure 1.

It will now be apparent, that there has been provided, a novel synchronizing arrangement for an automatic control system which utilizes a gyroscope to obtain both rate and displacement functions so that during manual operation of the control surface to change attitude of the craft the apparatus is synchronized with the changing attitudes of the aircraft so that automatic control may be selectively introduced without the craft experiencing a bump during the transition from manual to automatic control.

I claim as my invention:

1. Apparatus for selectively controlling the attitude of a craft automatically in accordance with a signal and permitting direct manual control of the craft, said apparatus comprising: a gyroscope having a rotor with but two axes of freedom namely a spin axis and a precession axis, a signal generator operated in accordance with the precession of the rotor and a torque motor for precessing said gyroscope to limit said signal generated in proportion to the rate of change of craft attitude; a servomotor for operating a control surface to change attitude; a trim motor for operating a signal generator; means operated during positioning of said control surface for generating a follow-up signal; means for alternatively manually positioning said control surface; and means for coupling said gyroscope signal generator to said servomotor during automatic control and to said trim motor during manual control of said surface; means for further controlling said trim motor from said follow-up signal generator and said trim motor generator during manual control of the surface; and means for also applying said further control from said follow-up signal generator and said trim motor generator to the torque motor of said gyroscope during both manual and servomotor operation of the control surface.

2. Apparatus for automatically operating a control surface of an aircraft or permitting direct manual actuation thereof, said apparatus comprising: a gyroscope having a rotor with but two axes of rotation namely a spin axis and a precession axis and responding to the rate of turn of said craft about the axis controlled by said surface, by angular movement about the precession axis, said gyroscope including a first operable signal generator and a torque motor for precessing said gyroscope; a servomotor for positioning said control surface and operatively engageable therewith; a follow-up signal generator positioned by said servomotor or by said manually operable controller; a trim motor; a trim signal generator positioned from said trim motor; means for controlling said trim motor from said first signal generator, said follow-up signal generator, and said trim signal generator during manual positioned of said control surface manually adjustable means to vary the relative effects of said follow-up and trim signal generators on said controlling means; and means for controlling said gyroscope torque motor from said follow-up signal generator and said trim signal generator during manual operation of said control surface so that during manual operation of said control surface to change the attitude of said craft, said trim signal generator and said first signal generator will oppose said follow-up signal generator and said follow-up signal generator will provide a signal in excess over the trim signal generator to energize said torque motor to limit operation of the first signal generator in accordance with the rate of change of attitude of the craft.

3. Apparatus for automatically operating a control surface of an aircraft in accordance with a control signal or permitting direct manual control of said surface, said apparatus comprising: a gyroscope having a rotor with but two axes of freedom, namely a spin axis and a precession axis and responsive to the rate of change of attitude of said craft, said gyroscope including a torque motor and a signal generator; a servomotor adapted to operate said surface; a follow-up signal generator positioned with said surface; means for controlling said servomotor from said gyroscope generator and said follow-up signal generator; means for energizing said torque motor from said follow-up signal generator; and balancing means for said apparatus including means for opposing the signal applied to said torque motor from said rebalance signal generator during manual operation of said control surface, said opposing means comprising a trim signal generator, a trim motor for operating said trim signal generator, and means for controlling said trim motor from said gyro signal generator, said follow-up signal generator, and said trim signal generator; and means for additionally controlling said torque motor from said trim signal generator.

4. Control apparatus for an aircraft having a control surface, said apparatus comprising: a gyroscope having a rotor with but two axes of freedom namely a spin axis and a precession axis and precessing upon change in attitude of said aircraft about an axis perpendicular to the spin and precession axes, said gyroscope including a first voltage signal generator and a torque motor for limiting operation of said generator proportional to the rate of change of attitude of said aircraft; a servomotor adapted to operate said control surface; a follow-up signal generator positioned with said control surface; a trim motor; a trim signal generator positioned by said trim motor; a servo amplifier; means for controlling said servo amplifier from said first signal generator, said follow-up signal generator, and said trim signal generator; means for selectively coupling said servo amplifier with said servomotor during automatic control and to said trim motor during manual operation of said surface; and means for controlling said torque motor from said follow-up signal generator and said trim signal generator whereby the torque developed by said gyroscope torque motor is proportional to the rate of change of attitude of said aircraft.

5. Control apparatus for an aircraft having a control surface, said apparatus comprising: a gyroscope having a rotor with but two axes of freedom namely a spin axis and a precession axis and responsive to the rate of turn of the craft about an axis controlled by said surface, said gyroscope having a torque motor for controlling movement about the precession axis and a first signal generator; a servo amplifier; a servomotor adapted to position said surface; a follow-up signal generator positioned with said surface; a trim motor; a trim motor displacement signal generator; means for coupling said amplifier to said servomotor or to said trim motor; means for controlling said amplifier from said first signal generator, said follow-up signal generator, and said trim signal generator during manual operation of said surface; and additional means for controlling said gyroscope torque motor from said follow-up and said trim signal generators during manual control surface operation, to maintain the servo amplifier in unoperated condition during manual operation of the surface.

6. Apparatus for controlling an aircraft having a control surface, said apparatus comprising: a gyroscope having a rotor with but two axes of rotation namely a spin axis and a precession axis and responsive to angular movement of the craft about an axis controlled by said surface, said gyroscope including a signal generator operated on precession of the rotor and a torque motor for precessing the rotor; a servo amplifier; a servomotor for positioning said surface; a follow-up generator positioned with said surface; means for controlling the amplifier from both signal generators; means for controlling said servomotor from said servo amplifier to effect automatic control of said surface; balanceable means for energizing said torque motor from said follow-up signal generator; a third signal generator; a balancing motor for positioning said third generator; means for operating said balancing motor from said amplifier during manual operation of said surface; and means for modifying the energization of said torque motor by said balanceable means from said follow-up generator in accordance with the magnitude of adjustment of said third generator.

7. Control apparatus for an aircraft having a control surface, said apparatus comprising: a servomotor adapted to position said surface; a servo amplifier; a gyroscope having a rotor with but two axes of freedom namely a spin axis and a precession axis and having a signal generator and a torque motor for precessing said gyroscope; a condition responsive device sensing changes in a condition; a trim motor adapted to be connected to said servo amplifier; signal generating means positioned by said condition responsive device and said trim motor; balanceable means including said signal generating means for controlling said torque motor in accordance with the algebraic effect of the signals from said signal generating means; and means for controlling said servo amplifier from said trim motor generator and said gyroscope generator to maintain said amplifier in balanced condition during changes in said condition through manual operation of said surface.

8. In an automatic control apparatus for an aircraft having a servomotor adapted to be operatively connected with a control surface of said craft; a gyroscope with a rotor having but two axes of rotation, namely a spin axis and a precession axis and having a torque motor for precessing said gyroscope and a first signal voltage generator operated on precession of the rotor; a follow-up voltage signal generator positioned with said surface; a third voltage signal generator; a balanceable voltage responsive control means selectively connected to said three signal generators and operated in response to a resultant voltage signal therefrom; means for operating said third signal generator from said control means during manual operation of said control surface; further means for adjusting the relative proportions of the follow-up and third signals applied to the balanceable control means; means for energizing said gyroscope torque motor from said follow-up and third signal generators; means to vary the relative proportion of the follow-up and third signals applied to the gyroscope torque motor; and selective means for alternatively connecting said control means to said servomotor for operation thereof to effect automatic balanceable control of said surface.

References Cited in the file of this patent

UNITED STATES PATENTS

| | | |
|---|---|---|
| 2,566,368 | Purl | Sept. 4, 1951 |
| 2,570,905 | Young et al. | Oct. 9, 1951 |
| 2,586,817 | Harris | Feb. 26, 1952 |
| 2,591,938 | Holliday | Apr. 8, 1952 |
| 2,597,077 | Douglas | May 20, 1952 |
| 2,602,611 | Glenny | July 8, 1952 |
| 2,617,615 | Von Eschen | Nov. 11, 1952 |
| 2,618,771 | Stanley et al. | Nov. 18, 1952 |